US010917244B1

(12) United States Patent
Martin et al.

(10) Patent No.: US 10,917,244 B1
(45) Date of Patent: Feb. 9, 2021

(54) BLOCKCHAIN NETWORK COMMUNICATION MANAGEMENT

(71) Applicant: CALLFIRE, INC., Santa Monica, CA (US)

(72) Inventors: Jordan Martin, Victoria (CA); Justin Martin, Lake Cowichan (CA)

(73) Assignee: CALLFIRE, INC., Santa Monica, CA (US)

( * ) Notice: Subject to any disclaimer, the term of this patent is extended or adjusted under 35 U.S.C. 154(b) by 0 days.

(21) Appl. No.: 16/384,762

(22) Filed: Apr. 15, 2019

Related U.S. Application Data

(60) Provisional application No. 62/722,076, filed on Aug. 23, 2018.

(51) Int. Cl.
*H04L 9/06* (2006.01)
*H04L 9/32* (2006.01)
*H04W 12/10* (2009.01)

(52) U.S. Cl.
CPC .......... *H04L 9/3247* (2013.01); *H04L 9/0618* (2013.01); *H04W 12/1006* (2019.01)

(58) Field of Classification Search
CPC . H04L 9/3247; H04L 9/0618; H04W 12/1006
See application file for complete search history.

(56) References Cited

U.S. PATENT DOCUMENTS

| 8,429,232 B1* | 4/2013 | Appenzeller | H04L 51/12 709/206 |
| 2001/0003203 A1* | 6/2001 | Mache | H04L 51/04 726/12 |
| 2007/0288746 A1* | 12/2007 | Jones | H04L 51/00 713/156 |
| 2008/0319871 A1* | 12/2008 | Thomas | G06Q 30/02 705/26.8 |

(Continued)

OTHER PUBLICATIONS

Mu Zhang, Dan Yao, Qian Zhou The Application and Design of QR Code in Scenic Spot's eTicketing, International Journal of Science and Technology, vol. 2 No. 12, Dec. 2012, pp. 817-822 (Year: 2012).*

(Continued)

*Primary Examiner* — Catherine Thiaw
(74) *Attorney, Agent, or Firm* — Knobbe, Martens, Olson & Bear, LLP

(57) ABSTRACT

A device that is capable of sending/receiving telephony-based messages may communicate with a blockchain network without having a direct connection (e.g., internet connection) to the blockchain network. A message may be communicated via a telephony network to a telephony carrier system. The telephony carrier system may translate the telephony-based message into a blockchain-based communication and provide the blockchain-based communication to the blockchain network. In addition, an entity on the blockchain network may communicate with a device that does not have an internet connection to the blockchain (Continued)

network. The entity may initiate a blockchain-based communication that is received by an on-chain interface of a telephony network carrier. In response, the telephony network carrier may generate a telephony-based message and communicate the telephony-based message to the user device.

18 Claims, 10 Drawing Sheets

(56) References Cited

U.S. PATENT DOCUMENTS

| | | | | |
|---|---|---|---|---|
| 2012/0064926 | A1* | 3/2012 | Tao | H04W 4/12 |
| | | | | 455/466 |
| 2013/0218571 | A1* | 8/2013 | Tamir | G07C 9/00087 |
| | | | | 704/273 |
| 2015/0278820 | A1* | 10/2015 | Meadows | G06Q 20/40145 |
| | | | | 705/64 |
| 2018/0075028 | A1* | 3/2018 | Ruschin | G06Q 10/00 |
| 2018/0255130 | A1* | 9/2018 | Kozloski | H04L 67/104 |
| 2018/0330342 | A1* | 11/2018 | Prakash | G06Q 20/065 |
| 2018/0336286 | A1* | 11/2018 | Shah | G06Q 10/10 |
| 2018/0349893 | A1* | 12/2018 | Tsai | G06Q 20/3821 |
| 2018/0349896 | A1* | 12/2018 | Arora | G06Q 20/3829 |
| 2019/0028278 | A1* | 1/2019 | Gilson | H04L 9/3247 |
| 2019/0114395 | A1* | 4/2019 | Lenchner | G06F 21/10 |
| 2019/0172057 | A1* | 6/2019 | Vincent | H04L 9/3247 |
| 2019/0354964 | A1* | 11/2019 | Snow | G06F 21/00 |
| 2020/0134206 | A1* | 4/2020 | Thekadath | H04L 9/3247 |

OTHER PUBLICATIONS

A. DeSantis, A. Castiglione, U. Ferraro Petrillo: "An Extensible Framework for Efficient Secure SMS", 2010, IEEE, p. 843-850 (Year: 2010).*

S. Biswas, S. Asif "SMS Based Information Retrieval System For Low End Mobile Devices", 2013, IEEE, 6 pages. (Year: 2013).*

* cited by examiner

BLOCKCHAIN NETWORK COMMUNICATION MANAGEMENT

CROSS-REFERENCE TO RELATED APPLICATIONS

The present application claims priority to U.S. Provisional Patent Application No. 62/722,076, filed on Aug. 23, 2018, which is incorporated by reference herein.

BACKGROUND

Electronic devices may be used to exchange information over communication networks. For example, electronic devices may communicate with each over via the internet. In some cases, information regarding the communications may be recorded in a distributed ledger, such as a blockchain. Blockchains are distributed in the sense that they store information in blocks of records that are cryptographically linked and distributed among many different devices. A blockchain is typically immutable, which means that the information stored in the records cannot be changed or deleted; information may only be added to the blockchain in the form of new records. The distributed nature of the blockchain and the cryptographic linking of blocks within the blockchain facilitate the immutability of the information stored in the blockchain.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
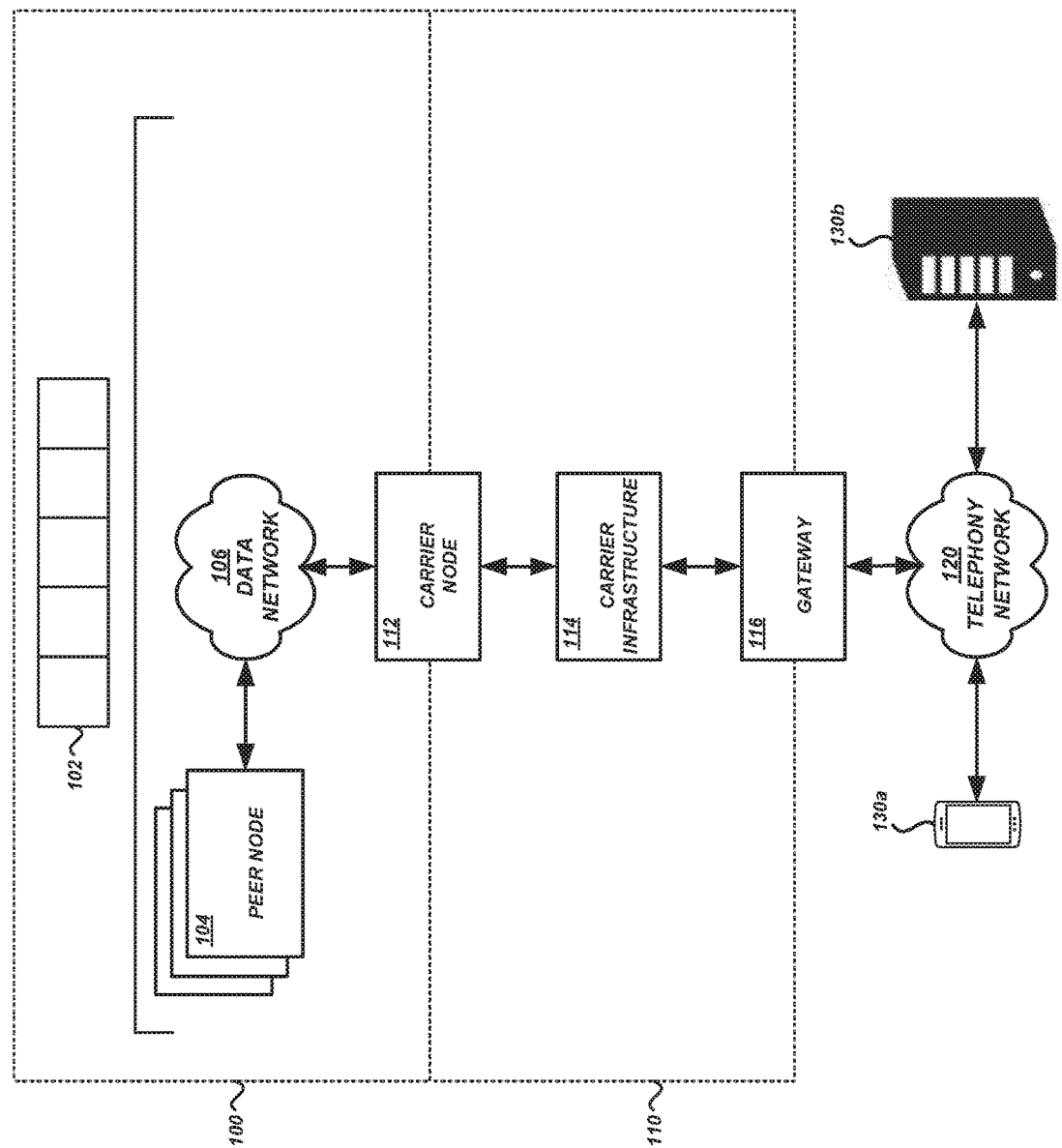
FIG. 1 is a block diagram of an illustrative computing environment including a blockchain network, a telephony network, a telephony carrier system, and a user device according to some embodiments.

The present disclosure is directed to communication between a blockchain network and devices on a telephony network. Conventionally, the options for communicating with blockchain networks are limited to either (1) running a node of the blockchain network locally on the system that is communicating with the blockchain network, or (2) employing a blockchain-network-based service to communicate with the blockchain network via remote procedure call ("RPC") and Hypertext Transfer Protocol ("HTTP"). In each of these situations, an internet connection is required.

Aspects of the present disclosure address, among other things, the above-referenced limitations with conventional methods of using blockchain networks. In some embodiments, a device that is capable of sending/receiving telephony-based messages (e.g., short message service or "SMS" messages) may communicate with a blockchain network without having a direct connection (e.g., internet connection) to the blockchain network. For example, a user may use a mobile phone to communicate with an entity on a blockchain network. The user may send a telephony-based message addressed to a particular phone number, such as a phone number associated with the entity or with the blockchain network. The message may include data representing a blockchain transaction (e.g., a signed transaction that includes address information and a payload already formatted for processing by the blockchain network). The message may be communicated via a telephony network (e.g., the public switched telephone network or "PSTN") to a telephony network carrier system, such as a telephony network carrier system associated with the user device or the destination phone number. The telephony network carrier system (also referred to herein as a "carrier system" for convenience) may provide the blockchain-based communication to the blockchain network. From there, the blockchain-based communication may be handled as a native blockchain-based communication would be handled. As another example, an entity on the blockchain network may communicate with a device that does not have an internet connection to the blockchain network. The entity may initiate a blockchain-based communication that is received by an on-chain interface of a carrier system. In response, the carrier system may generate a telephony-based message and communicate the telephony-based message to the user device. Thus, a device may interact with a blockchain network—in either a one-way or bi-directional manner—using telephony-based messages communicated over a telephony network and without having a direct connection to the blockchain network via the internet.

Additional aspects of the present disclosure relate to various interactions with blockchain network-based functions using telephony-based messages. In some embodiments, a blockchain network may provide the ability to execute on-chain logic. For example, a blockchain network may be configured to use "smart contracts" or other on-chain computer programs to provide features to users of the blockchain network. A smart contract may perform various programmatic operations, such as transferring value (e.g., cryptocurrency tokens), transmitting messages, recording data in the distributed ledger, monitoring for the occurrence of events, enforcing rules, or performing other logical functions. In one specific, non-limiting example, a device such as an automated teller machine ("ATM") may communicate with the blockchain network and initiate the transfer of value from one account to another by transmitting a telephony-based message via a telephony network. A carrier system may receive such a message, determine a blockchain-based communication from the telephony-based message, and submit the blockchain-based communication to the blockchain network. A smart contract on the blockchain network may receive or detect the blockchain-based communication, and begin execution (e.g., determining whether preconditions are met, processing a transfer of value, recording data regarding the transfer of value, etc.). If necessary, the smart contract may generate a message for transmission back to the originating device confirming successful execution of the smart contract or failure thereof.

Although aspects of some embodiments described in the disclosure will focus, for the purpose of illustration, on particular examples of blockchain networks, network interfaces, messaging protocols, and end user devices, the examples are illustrative only and are not intended to be limiting. In some embodiments, the techniques described herein may be applied to various alternatives, such as other forms of distributed ledger networks, other types of interfaces to blockchain networks, other end user devices and communication protocols, etc. Various aspects of the disclosure will now be described with regard to certain examples and embodiments, which are intended to illustrate but not limit the disclosure.

Example Computing Environment

With reference to an illustrative embodiment, FIG. 1 shows a computing environment in which aspects of the present disclosure may be implemented. As shown, the computing environment may include a blockchain network 100, a carrier system 110, a telephony network 120, and various end user devices 130a, 130b. End-user devices 130a and 130b may be referred to collectively as user devices 130, or individually as a user device 130.

The blockchain network 100 may include various nodes 104 across which a distributed ledger—a blockchain 102 in this example—is distributed. In some embodiments, a blockchain network 100 may include a plurality of peer nodes 104, with each peer node 104 storing a copy of at least a portion of the blockchain 102. Entities that want to utilize the features of a blockchain 102 (e.g., immutable data storage, value exchange, smart contracts or other on-chain logic, etc.) each implement a peer node 104.

The infrastructure on which blockchain network 100 is implemented may be referred to as a "data network" to highlight its use as a network for transmitting bit-encoded data. In some embodiments, the blockchain network 100 may be implemented on a packet-switched data network 106, such as the internet. In some cases, the data network 106 may be at least partially implemented using a private network, personal area network, local area network, wide area network, etc., or some combination thereof, some or all of which may or may not have access to and/or from the Internet. The peer nodes 104 of the blockchain network 100 may communicate with each other using such a data network 106.

The example components of the blockchain network 100 shown in FIG. 1 are illustrative only and are not intended to be limiting. In some embodiments, a blockchain network 100 may have fewer, additional, and/or alternative components.

The carrier system 110 may include various components for providing the features described herein. In some embodiments, the carrier system 110 may include a carrier node 112 for communicating with the blockchain network 100. For example, the carrier node 112 may be one of the peer nodes of the blockchain network 100, and may be used by the carrier system 110 to manage the transmission and receipt of blockchain-network-based communications to and/or from the blockchain network 100. Communication may also occur with various other peer nodes 104 of the blockchain network 100. In some embodiments, the carrier system 110 may include telephony carrier infrastructure 114 for communicating with the telephony network 120. For example, the telephony carrier infrastructure 114 may include a telephony network gateway 116 that manages transmission and receipt of messages (e.g., SMS messages) over the telephony network 120.

In some embodiments, telephony network 120 may be a circuit-switched network or other telephone network. For example, telephony network 120 may be a publicly-accessible telephone network, such as the PSTN. In some cases, the telephony network 120 may be or include a private telephone network, such as a private branch exchange ("PBX"). In some embodiments, telephony network 120 may also include features for transmitting bit-encoded data in a digital manner rather than merely in an analog manner. For example, the telephony network 120 may be or include a digital cellular telephone network.

The carrier system 110 may be implemented on one or more physical computing devices that provide computing services and resources to users of a telephony network 120. In some embodiments, the carrier system 110 (or individual components thereof, such as the carrier node 112, telephony network gateway 116, etc.) may be implemented on one or more host devices, such as blade servers, midrange computing devices, mainframe computers, desktop computers, or any other computing device configured to provide computing services and resources. For example, a single host device may execute one or more carrier nodes 112, telephony network gateways 116, other elements of carrier infrastructure 114, etc. The carrier system 110 may include any number of such hosts.

The example components of the carrier system 110 shown in FIG. 1 are illustrative only and are not intended to be limiting. In some embodiments, a carrier system 110 may have fewer, additional, and/or alternative components.

The user devices 130 are devices configured to send/receive text-based messages, multimedia-based messages, and/or various other messages over a phone network such as the telephony network 120. Such messages may be referred to as telephony-based messages. For example, a user device 130 may be configured with application software that provides SMS message functionality to send text messages to other devices that also provide SMS message functionality. In some embodiments, user devices 130 may also or alternatively be configured to communicate telephone-based messages other than SMS messages, such as multimedia messaging service ("MMS") messages, voice communications, and/or communications using other telephone-based protocols. The carrier system 110 may be configured to communicate with the user devices 130 using such telephone-based protocols.

In some embodiments, the individual end-user devices 130 may be any of a wide variety of electronic communication devices, including personal computing devices, terminal computing devices, laptop computing devices, tablet computing devices, electronic reader devices, wearable computing devices, mobile devices (e.g., cellular and other mobile phones, smart phones, media players, handheld gaming devices, etc.), servers, midrange computing systems, mainframe computing systems, ATMs, and various other electronic devices and appliances.

Example Communications Between a Blockchain Network and a Telephony Network

Figure 2:
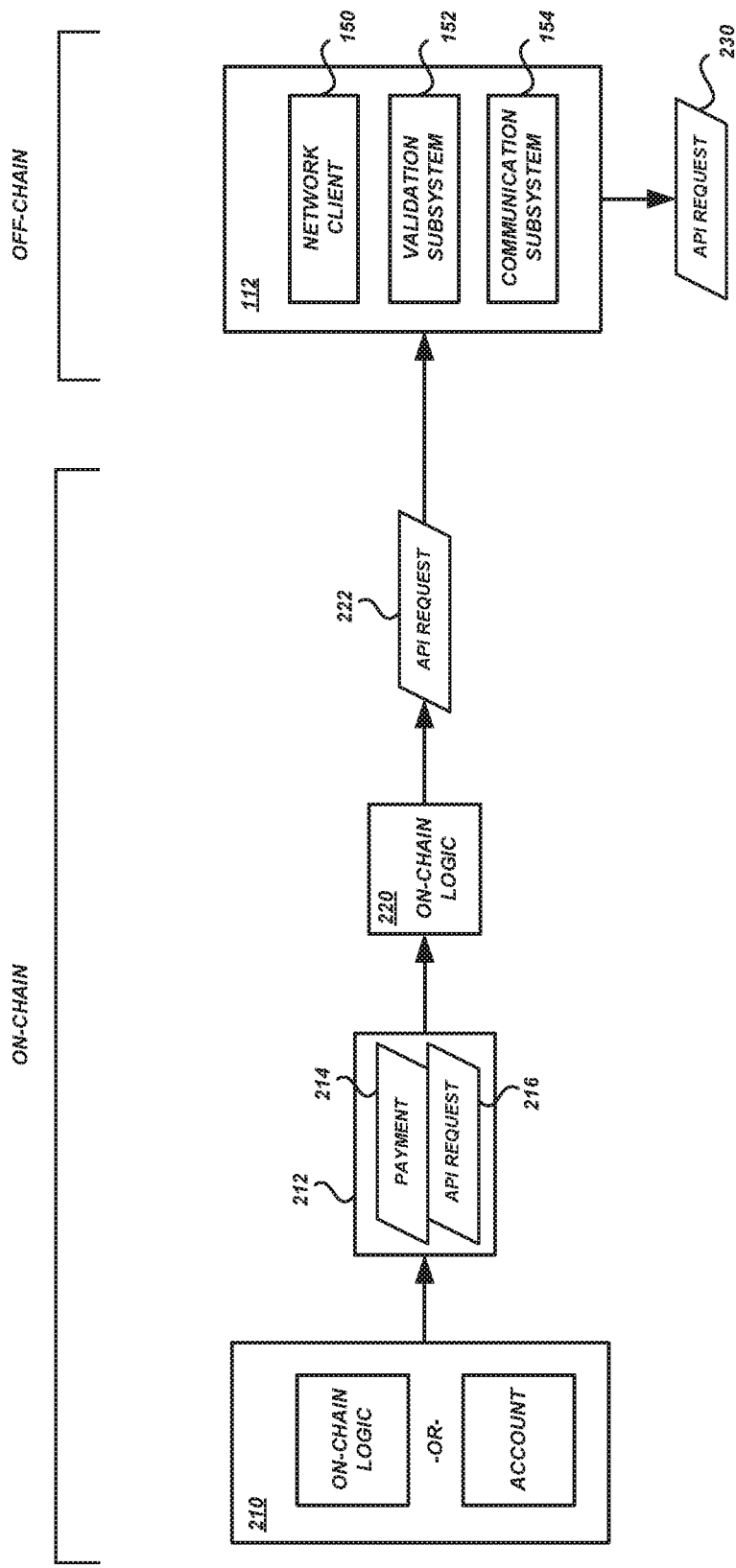
FIG. 2 is a block diagram of various data flows and interactions between a blockchain network and other systems and networks during processing of a communication directed to a user device using on-chain logical processing, according to some embodiments.

FIG. 2 shows example data flows and interactions between a blockchain network 100 and other systems and networks during processing of a communication directed to an off-chain user device 130 via on-chain logic of a carrier system 110. Such messages may be referred to as "outbound messages" to highlight their direction as being outbound with respect to the blockchain network 100.

An entity, such as a company or individual person, may use a user device 130 to interact with the blockchain network 100. For example, the user device 130 may be a mobile phone that has access to the telephony network 120, and a user of the user device 130 may have an account on the blockchain network 100. The user may wish to receive messages that originate from the blockchain network 100 or are otherwise transmitted via the blockchain network 100, such as messages confirming the transfer of value from one account to another account.

A message origin 210 on the blockchain network 100 may generate blockchain message data 212. Illustratively, the blockchain message data 212 may represent an application programming interface ("API") request to send a telephony-based message to the user device 130. The message origin 210 may include on-chain logic, such as a smart contract that monitors for some event and transfers value to an account of the user in response to occurrence of the event. The blockchain message data 212 generated by the message origin 210 may include data representing a payment 214 (e.g., the value to be paid to the carrier system 110 for providing message transmission services to the message origin 210). The blockchain message data 212 may also include a payload, such as data representing an API request 216 to executed by the carrier system 110.

In some embodiments, the carrier system 110 may expose some or all of the carrier system's API to the blockchain network 100 via carrier on-chain logic 220. In this way, entities on the blockchain network 100 may employ the services of the carrier system 110—including the execution of off-chain logic through the use of an API request—over the blockchain network 100 without requiring separate off-chain access to the carrier system 110. The carrier system 110 API that is exposed to—or otherwise accessible from—the blockchain network 100 may include functionality other than the mere sending of messages to user devices 130 that are off-chain. For example, any other feature provided by the carrier system 110 to its off-chain clients may be utilized via the API that is exposed to the blockchain network 100. In some embodiments, the on-chain logic 220 is deployed to the blockchain and is therefore part of the blockchain network 100. Illustratively, the on-chain logic (e.g., smart contract) may represented by code that may be stored in the blockchain 102. When a message or other transaction invokes the on-chain logic 220, the code is executed by one or more entities of the blockchain network 100, such as the carrier node 112, one or more peer nodes 104, etc.

In one specific, non-limiting embodiment, the carrier system's off-chain API (or portions thereof) may be exposed to the blockchain network 100 by generating an intermediate API specification of the off-chain API. The intermediate API specification may be a lightweight, standardized representation of the carrier-specific off-chain API. Advantageously, this standardized representation allows other entities to discover the features provided by the API and generate API calls as long as the entities are configured to parse and process API specifications represented using the standard. Illustratively, on-chain logic such as a smart contract may be configured to parse and process API specifications representing using the standard. Thus, an on-chain entity may interact with the carrier system's off-chain API through the on-chain logic.

Returning to the example above, message origin 210 may generate blockchain message data 212 that is obtained by, detected by, or otherwise causes invocation of on-chain logic 220 (e.g., a smart contract) of the carrier system 110. The on-chain logic 220 may perform any necessary processing to extract or generate the API request 222 that will be received by the carrier node 112 of the carrier system 110. For example, the on-chain logic 220 may merely extract data representing the API request and then provide the API request 222 to the carrier node 112. As another example, on-chain logic 220 may perform more intensive processing to deserialize or otherwise generate the API request 222 from the API request data 216 in the blockchain message data 212. If the blockchain network 100 allows inexpensive or free execution of on-chain logic, then performing this processing in a smart contract of the carrier system 110 may be preferred. However, if execution of on-chain logic is expensive for a particular blockchain network 100, then the smart contract or other on-chain logic 220 of the carrier system 110 may perform as little processing as possible to obtain and transmit data regarding the API request 222 to the carrier node 112, which may then perform more extensive processing off-chain to construct and execute an API request.

In some embodiments, the carrier node 112 may include various components or other subsystems for processing blockchain transaction data and generating API requests that are executable by the carrier infrastructure 114. For example, as shown, the carrier node 112 may include a blockchain network client 150 that interacts with the blockchain network 100 on behalf of the carrier system 100. The blockchain network client 150 in this example may interact with the blockchain network via on-chain logic 220. Illustratively, the blockchain network client 150 may receive an API request 222 from the on-chain logic 220. A validation subsystem 152 can decrypt the API request 222, if necessary, and validate the API request 222. For example, the validation subsystem 152 may deserialize the API request 222 into a data structure that may be used by the carrier infrastructure. A communication subsystem 154 may then package and transmit the API request 230 to the appropriate carrier infrastructure 114 for execution. In the example above, the carrier infrastructure may transmit a telephony-based message (e.g., an SMS message) to a user device 130 via the telephony network 120.

In some embodiments, a message may not be able to be sent over a telephony network 120 without first authenticating and authorizing the originator of the message. For example, regulatory requirements for telephony networks may include restrictions for sending messages over the telephony network. Thus, outbound messages that are then sent as (or cause other messages to be sent as) telephony-based messages to user devices 130 via the telephony network 120 may not be permitted by any entity on the blockchain network 100 merely submitting an API request to the carrier system 110. Rather, entities wishing to send such messages may be required to be authorized ("whitelisted") by the carrier before any messages may be sent on behalf of the entities. For example, an entity may submit an API request via the blockchain network 100 or transmit an offline API request to establish an account with the carrier system 110. The entity may be required to provide identifying information, address information, and the like to the carrier system 110. The carrier system may store the data in a data store, and use the stored data to authenticate and authorize the entity to initiate the sending of messages via the telephony network 120 when a telephony-based message is to be sent. Illustratively, the carrier system 110 may send the telephony-based message using the entity's phone number as the originating phone number of the message.

The message origins, transactions, on-chain logical processes, data types, and communications shown in FIG. 2 and described herein are illustrative only and are not intended to be limiting. In some embodiments, additional or alternatives may be used without departing from the scope of the present disclosure.

Figure 3:
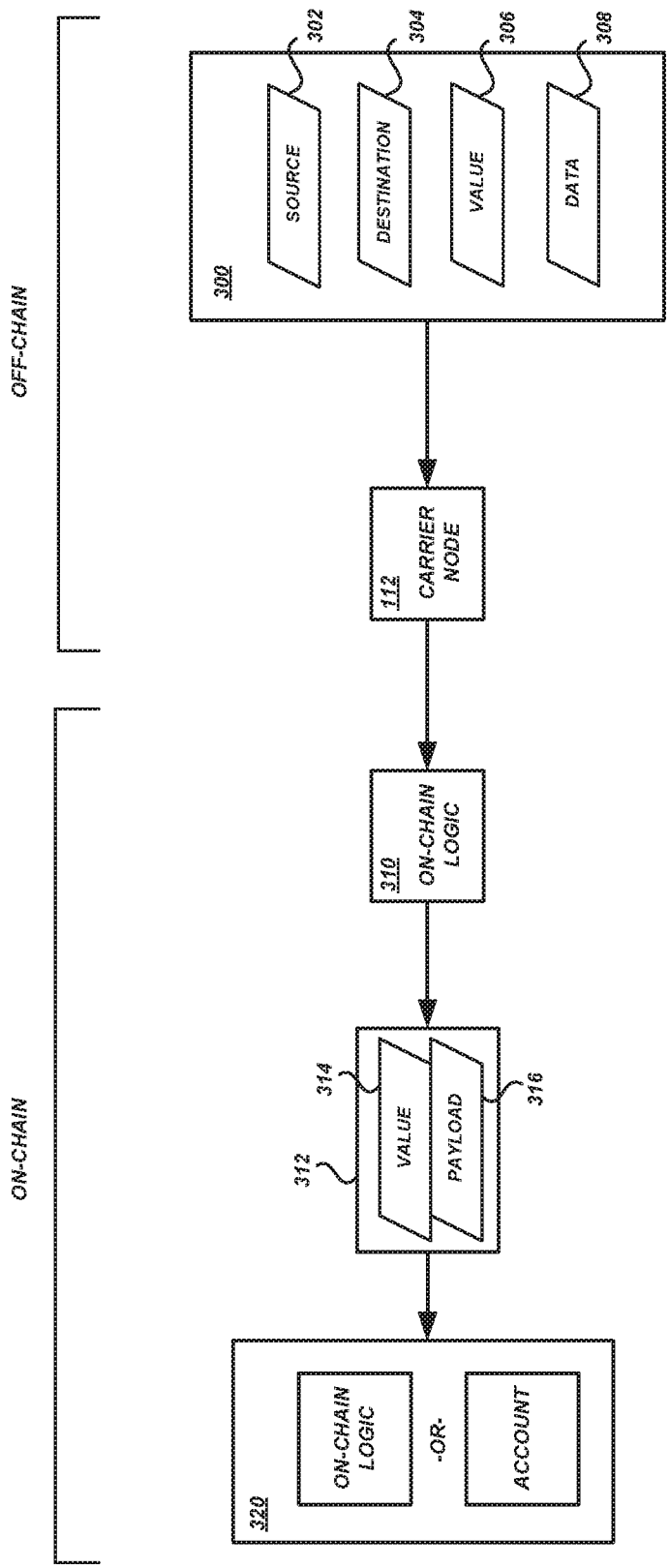
FIG. 3 is a block diagram of various data flows and interactions between a blockchain network and other systems and networks during processing of a communication from a user device to the blockchain network using on-chain logical processing, according to some embodiments.

FIG. 3 shows example data flows and interactions between a blockchain network 100 and other systems and networks during processing of a communication directed to an on-chain logical processing component. Such messages may be referred to as "inbound messages" to highlight their direction as being inbound with respect to the blockchain network 100.

An entity, such as a company or individual person, may use a user device 130 to interact with the blockchain network 100. The entity may wish to invoke a particular function of the blockchain network, such as the transfer of value from one account to another account upon the occurrence of some condition. For example, the user device 130 may be an ATM that has access to the telephony network 130, but no access to the internet. In some cases, it may be possible for the ATM to establish an internet connection using the telephony network 130. However, doing so may be expensive (e.g., if the telephony network is a cellular network), not sufficiently reliable, or may have other undesirable features or effects. In comparison, transmitting a telephony-based message, such as an SMS message, may be faster, more reliable, less expensive, etc. Thus, the ATM may be configured to generate a blockchain network transaction message for transmission as a telephony-based message 300.

In some embodiments, as shown, the telephony-based message 300 may be formatted such that the blockchain network transaction therein may be easily initiated from the message. For example, the content of the telephony-based message 300 may be a serialized version of the blockchain transaction, including a data structure that is used natively by the blockchain network 100, or a serialized version of a data structure that is used by the carrier system 120 to derive and broadcast the transaction on the blockchain network 100. In some embodiments, the telephony-based message 300 or a portion thereof may be encrypted or otherwise obfuscated to prevent unauthorized access to information in the telephony-based message 300 (e.g., when the telephony-based message 300 is sent as a text-based SMS message).

The blockchain transaction—however it is included in the telephony-based message 300—may include various data elements that are used in execution of the blockchain transaction. For example, the telephony-based message 300 may include data representing a source address 302 for the blockchain account that is initiating the blockchain transaction, such as a user account or on-chain logic associated with the user device 130. The telephony-based message 300 may also include data identifying a destination address 304 of the blockchain transaction, such as on-chain logic 320 of the carrier system 110. The telephony-based message 300 may also include data representing a value 306 to be transferred, such as the value to be transferred to the carrier system 110 for providing blockchain network access services to the user device 130. The value 306 may also include the value to be transferred to a separate account or on-chain logic associated with an entity other than the carrier system 110, such as a separate destination 320 (e.g., the value 306 may be a sum of the total value to be transferred from the account associated with the source address 302). The telephony-based message 300 may also include a payload 308 that represents a second blockchain transaction to be initiated by on-chain logic 310 of the carrier system 110 (e.g., data representing a source account from which value is to be removed, a destination account to which value is to be added, a payload including data representing a condition upon which the transfer of value is to be completed or invocation of a function of the destination on-chain logic, etc.). The on-chain logic 310 of the carrier system 110 is to provide the second blockchain transaction to the blockchain network 110 and ultimately to a destination 320. The payload 308 may be formatted in a manner such that the second blockchain network transaction may easily be initiated from the data. For example, the payload 308 may be a serialized version of a signed second blockchain transaction, including a data structure that is used natively by the blockchain network 100, or serialized version of a data structure that is used by the carrier on-chain logic 310 to initiate a blockchain network transaction.

In some embodiments, the telephony-based message 300 may include data that is used by the on-chain logic 310 of the carrier system to initiate a blockchain transaction, without the telephony-based message itself including a blockchain transaction. For example, the telephony-based message 300 may include a data structure with the data elements (e.g., source, destination, value, payload) that are to be used by the carrier node 112 or on-chain logic 310 to generate and provide a blockchain transaction to the blockchain network 100 and ultimately to the destination 320. In these cases, the carrier system 110 may maintain a private key, associated with the source account 302, to use in signing the blockchain transaction for submission to the blockchain network 100.

The user device 130 may transmit the telephony-based message to the carrier system 110 via the telephony network 120. The user device 130 may address the telephony-based message using a telephone number associated with the carrier system 110, the blockchain network 100, etc. In some embodiments, the telephone number may be a general phone number used to send any type of message to the blockchain network 100 or to send any type of message to the carrier system 100. The telephony-based message may be routed by telephony system 120 to the carrier system 110. The carrier system infrastructure 114 may receive and perform any necessary processing on the message to determine that the message includes a communication to the blockchain network 100. For example, the destination address may be assigned to the blockchain network. As another example, an identifier within the message (e.g., a code within the payload or some other portion of the message) may identify the message as being directed to the blockchain network. Once the message is identified as being directed at the blockchain network 100, the carrier infrastructure 114 may provide the message to the carrier node 112.

The carrier node 112 of the carrier system 110 may include a blockchain network client 150 that is used to communicate with the blockchain network 100. The blockchain network client 150 may perform processing on the telephony-based message 300, if required. For example, the blockchain network client 150 may deserialize or otherwise process the contents of the telephony-based message 300. The blockchain network client 150 may generate or otherwise obtain the blockchain transaction data that will be used by the blockchain network 100 to process a blockchain transaction. The blockchain network client 150 may address the blockchain transaction to the carrier's on-chain logic 310, or the blockchain transaction may already be so addressed (e.g., when generated by the user device 130). The blockchain network client 150 may then provide the blockchain transaction data to the blockchain network 100.

Once the blockchain transaction data is submitted to the blockchain network 100, it may be detected by, received by, obtained by, or otherwise cause invocation of, carrier on-chain logic 310 for execution of the blockchain transaction. Carrier on-chain logic 310 may be a smart contract that performs further logical processing of the blockchain transaction. For example, carrier on-chain logic 310 may obtain and reserve the carrier system's portion of the value 302, and extract blockchain transaction data 312 from the payload data 308 prior to sending the blockchain transaction data 312 to a destination 320 on the blockchain network. The carrier on-chain logic 310 may then emit an event on the blockchain network 100 or otherwise cause the transmission of the blockchain transaction data 312 to the destination 320. In some embodiments, carrier on-chain logic 310 is deployed to the blockchain and is therefore part of the blockchain network 100. Illustratively, the on-chain logic (e.g., smart contract) may represented by code that may be stored in the blockchain 102. When a message or other transaction invokes the on-chain logic 310, the code is executed by one or more entities of the blockchain network 100, such as the carrier node 112, one or more peer nodes 104, etc.

The blockchain transaction data 312 may include data representing a value 314, a data payload 316 that is used by the destination 320 to perform on-chain or off-chain logical processing, other data, some combination thereof, etc. The destination 320 may include on-chain logic, such as a separate smart contract that performs certain processing related to the blockchain transaction (e.g., holding value until a condition is met, and then transferring the value to an account). In some embodiments, the destination 320 may be a blockchain account that receives the blockchain transaction data 312 and proceeds accordingly (e.g., recording information in the blockchain).

The message destinations, transactions, on-chain logical processes, data types, and communications shown in FIG. 3 and described herein are illustrative only and are not intended to be limiting. In some embodiments, additional or alternatives may be used without departing from the scope of the present disclosure.

Example Communications without Carrier System On-Chain Logic

Figure 4:
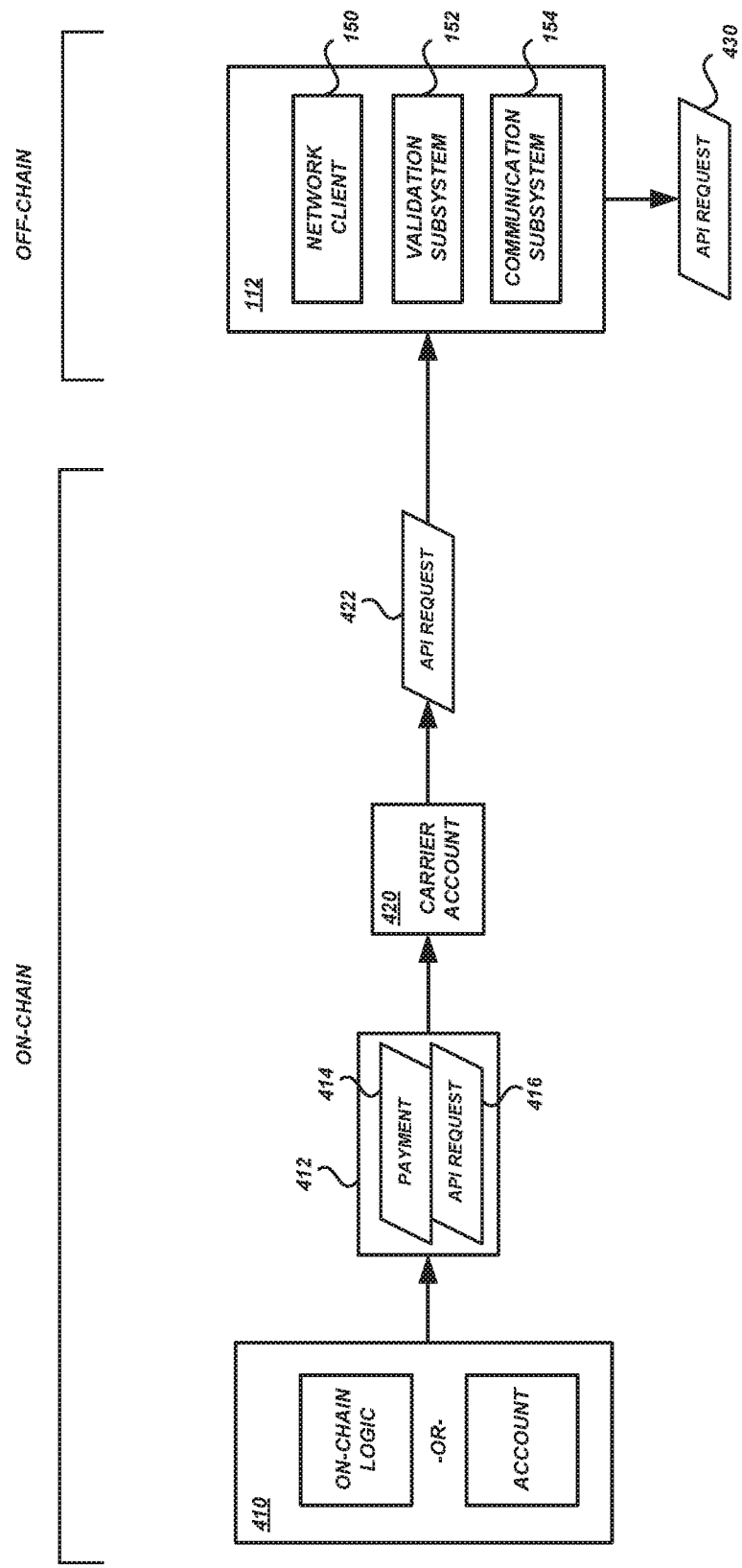
FIG. 4 is a block diagram of various data flows and interactions between a blockchain network and other systems and networks during processing of a communication directed to a user device using off-chain logical processing, according to some embodiments.

FIG. 4 shows example data flows and interactions between a blockchain network 100 and other systems and networks during processing of an outbound communication directed to an off-chain user device 130. In contrast to the interactions shown in FIG. 2, the interactions shown in FIG. 4 occur without using on-chain logic of a carrier system 110. In this way, the costs of processing such communications may be reduced in blockchain networks that require payment for execution of on-chain logic. Additionally, or alternatively, omitting on-chain logic of the carrier system 110 can in some cases simplify implementation. As long as the blockchain network 100 allows sending messages with data payloads, then entities on the blockchain network 100 may access off-chain processing and services provided by the carrier system 100 by providing messages with data payloads representing the operations to be performed (e.g., a serialized API call or other data used by the carrier system to perform functions).

Illustratively, an entity such as a company or individual person may wish employ the services of the carrier system 110 to send one or more telephony messages. For example, the entity may wish to have telephony-based messages transmitted to one or more user devices 130 in response to the occurrence of an event. The entity may use various features of the blockchain network 100 to monitor for the occurrence of the event. In response to detection of the event, the entity may transmit blockchain communication with a data payload representing an API request. The blockchain communication may be received and acted upon by the carrier system 110.

The entity may establish a message origin 410 on the blockchain network 100 that may include on-chain logic. In some embodiments, the on-chain logic may be on-chain logic (e.g., a smart contract) that monitors for the occurrence of the desired event and, in response to detecting occurrence of the event, automatically generates blockchain message data 412. The blockchain message data 412 may include data representing a payment 414 (e.g., the value to be paid to the carrier system 110 for providing message transmission service to the message origin 410). The blockchain message data 412 may also include data representing an API request 416 to be executed by the carrier system 110.

The blockchain message data 412 may be provided to the carrier account 420 that is on the blockchain network. In contrast to providing the blockchain message data 412 to carrier on-chain logic (as shown in FIG. 2, and described above), providing the blockchain message data 412 to the carrier account 420 may limit or prohibit on-chain processing of the blockchain message data 412. Rather than processing the blockchain message data 412 using on-chain logic, the data payload of the blockchain message data 412—the API request 416 in this example—may be accessed as API request data 422 by the carrier node 112 and processed off-chain.

The carrier node 112 may extract data representing an API request from the API request data 422. For example, the carrier node may deserialize an API request, or the carrier node 112 may perform more intensive processing to generate the API request from the API request data 422. In some embodiments, the carrier node 112 may include various components or other subsystems for processing blockchain message data 412 and generating API requests that are executable by the carrier infrastructure 114. For example, as shown, the carrier node 112 may include a blockchain network client 150 that interacts with the blockchain network 100 on behalf of the carrier system 100. The blockchain network client 150 in this example may interact with the blockchain network via on-chain account 420. Illustratively, the blockchain network client 150 may receive an API request data 422 from the on-chain carrier account 420. A validation subsystem 152 can decrypt the API request 422, if necessary, and validate the API request 422. For example, the validation subsystem 152 may deserialize the API request 422 into a data structure that may be used by the carrier infrastructure. A communication subsystem 154 may then package and transmit the API request 430 to the appropriate carrier infrastructure 114 for execution. In the example above, the carrier infrastructure may transmit one or more telephony-based messages to one or more user devices 130.

The message origins, transactions, on-chain accounts, off-chain processing, data types, and communications shown in FIG. 4 and described herein are illustrative only and are not intended to be limiting. In some embodiments, additional or alternatives may be used without departing from the scope of the present disclosure.

Figure 5:
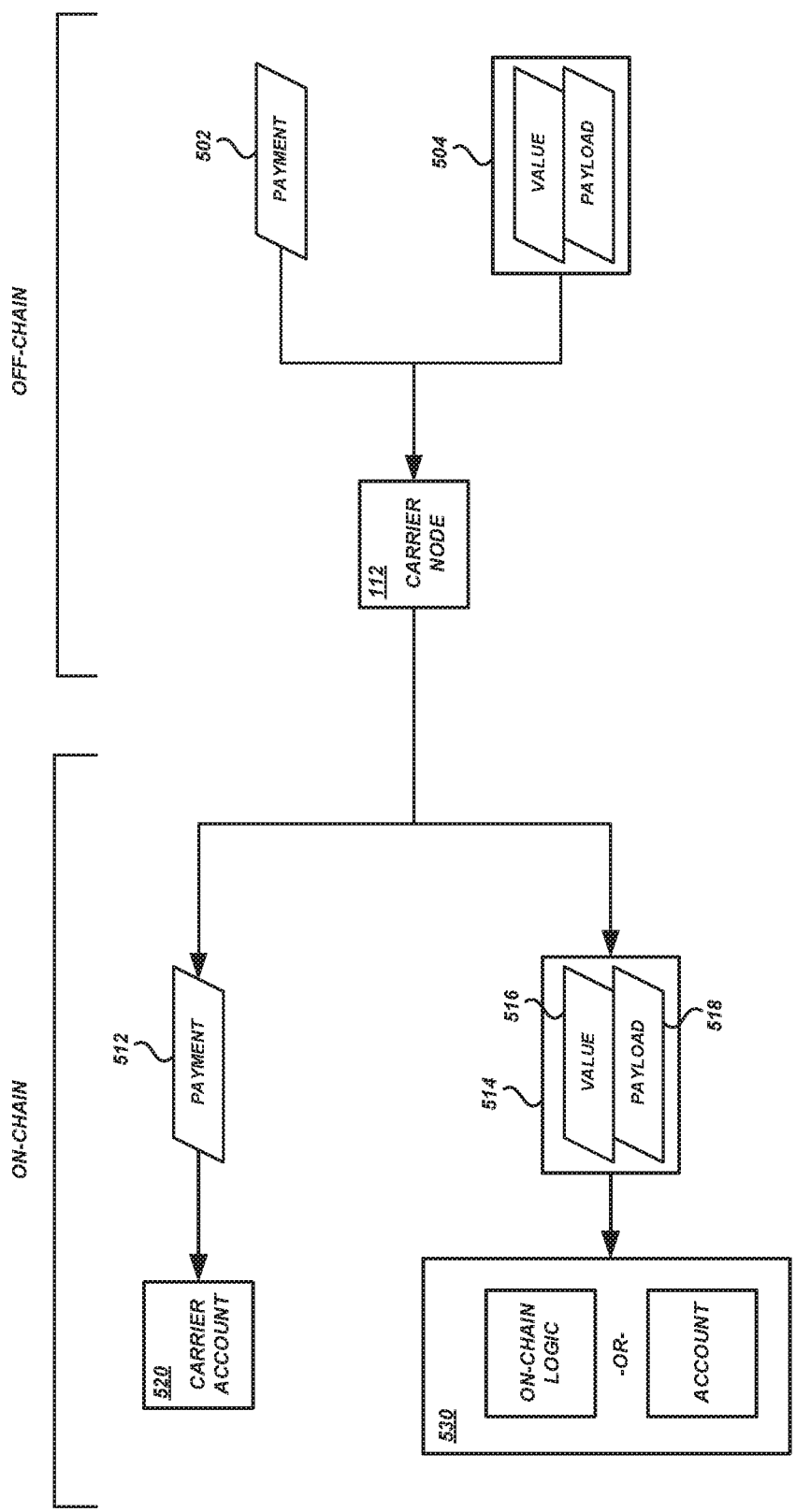
FIG. 5 is a block diagram of various data flows and interactions between a blockchain network and various other systems and networks during processing of a communication from a user device to the blockchain network using off-chain logical processing, according to some embodiments.

FIG. 5 shows example data flows and interactions between a blockchain network 100 and other systems and networks during processing of an inbound communication. In contrast to the interactions shown in FIG. 3, the interactions shown in FIG. 5 occur without using on-chain logic of a carrier system 110.

An entity, such as a company or individual person, may use a user device 130 to interact with the blockchain network 100. The entity may wish to invoke a particular function of the blockchain network, such as the transfer of value from one account to another account upon the occurrence of some condition. The user device 130 may provide a first telephony-based message regarding payment 502 to the carrier system 110. For example, the first telephony-based message may include data representing a first signed blockchain network transaction for transferring value to the carrier system 110 (e.g., source account, destination account, value to be transferred, payload if necessary). The user device 130 may provide a second telephony-based message 504 to be processed by the carrier system 110 and submitted to a separate on-chain account or on-chain logic. For example, the second telephony-based message 504 may include data representing a second signed blockchain network transaction addressed to the destination 530 account or on-chain logic (e.g., source account, destination account, value to be transferred, payload if necessary).

In some embodiments, the carrier system 110 may process the payment 502 prior to receiving telephony-based message 504, or prior to processing telephony-based message 504 for submission to the blockchain network 100. For example, the carrier node 112 of the carrier system 110 may enter the payment 512 on the blockchain network 100, and may wait for the transfer of value to the carrier's on-chain account 520 before proceeding with processing of telephony-based message 504. Illustratively, the carrier node 112 may wait until the transfer of value to the carrier account 520 has been recorded in the immutable distributed ledger of the blockchain network 100 before proceeding.

The telephony-based message 504 may include various data elements that are used in the transmission and execution of a blockchain transaction. For example, the telephony-based message 504 may include data representing a destination address of the blockchain transaction, and data representing a value to be transferred. The telephony-based message 504 may also include a payload that represents the blockchain transaction (e.g., data that causes invocation of a smart contract function, data representing a source account from which value is to be removed, data representing a destination account to which value is to be added, data representing a condition upon which the transfer of value is to be completed, etc.).

The carrier node 112 may generate, extract, or otherwise obtain blockchain transaction data 514 from the telephony-based message 504. For example, the carrier node 112 may generate transaction data 514 that represents value 516 to be transferred, and a payload 518. Illustratively, the telephony-based message 504 may be formatted in a manner such that a blockchain network transaction may easily be generated from the data. For example, the payload telephony-based message 504 may include a serialized version of a data structure that is used natively by the blockchain network 100, or serialized version of a data structure that is used by the carrier system 110 to initiate a blockchain network transaction.

The blockchain network client 150 may then provide the blockchain transaction data 514 to the blockchain network 100, where it is detected, received, or otherwise obtained by the destination 530 to which the blockchain transaction data is addressed. The destination 530 may be on-chain logic for execution of the blockchain transaction. For example, the on-chain logic 530 may be a smart contract that performs further logical processing of the blockchain transaction.

The message destinations, transactions, on-chain logical processes, data types, and communications shown in FIG. 5 and described herein are illustrative only and are not intended to be limiting. In some embodiments, additional or alternatives may be used without departing from the scope of the present disclosure.

Example Communications Using Payment Channels

Payment channels can be implemented as a means to support fast payments from users and off-chain applications. In some embodiments, implementation of a payment channel requires the carrier system 110 to have also implemented support for payment by tokens (e.g., cryptocurrency value) on the blockchain network 100. For example, the carrier system 110 may deploy on-chain logic, such as a smart contract. An entity that desires to use the services of the carrier system 110 can deposit a balance into the smart contract, and the smart contract may maintain the value and prohibit access to the value by either party (message origin or carrier system) until the payment channel is settled. During this time, the message origin can transfer value to the carrier system instantly through an off-chain payment channel.

Figure 6:
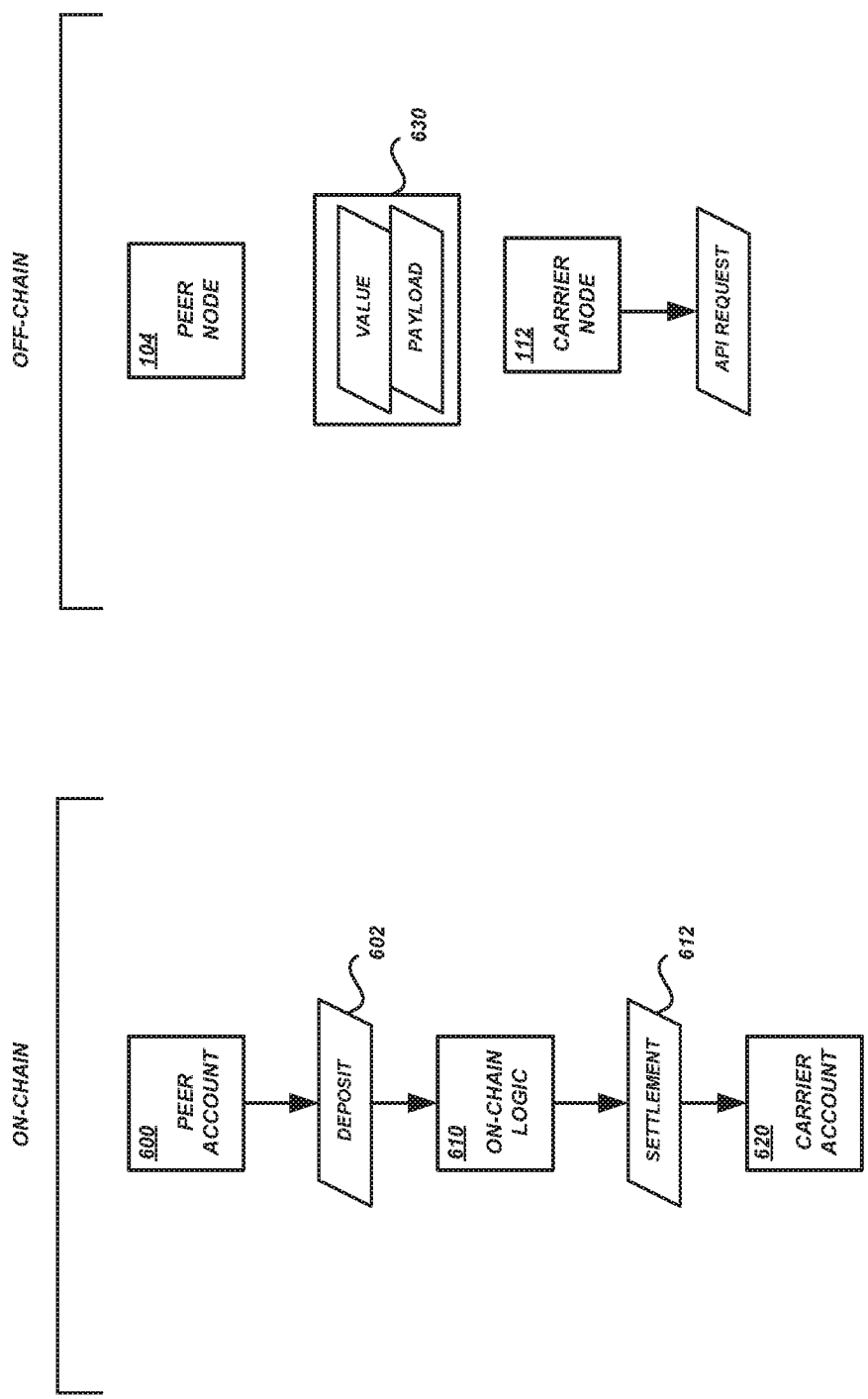
FIG. 6 is a block diagram of various data flows and interactions between a blockchain network and various other systems and networks using a payment channel according to some embodiments.

FIG. 6 shows example data flows and interactions between a blockchain network 100 and other systems when using a payment channel. In some embodiments, an entity such as a company or individual may wish to invoke off-chain functionality of the carrier system 110. The entity may transfer value 602 from the entity account 600 to carrier system on-chain logic 610. In addition, a peer node 104 of the entity may send an API request 630 to the carrier system's carrier node 112, which may process the API request 630 off-chain. Once the payment channel has settled, a settlement 612 may be provided to the carrier's on-chain account 620.

Figure 7:
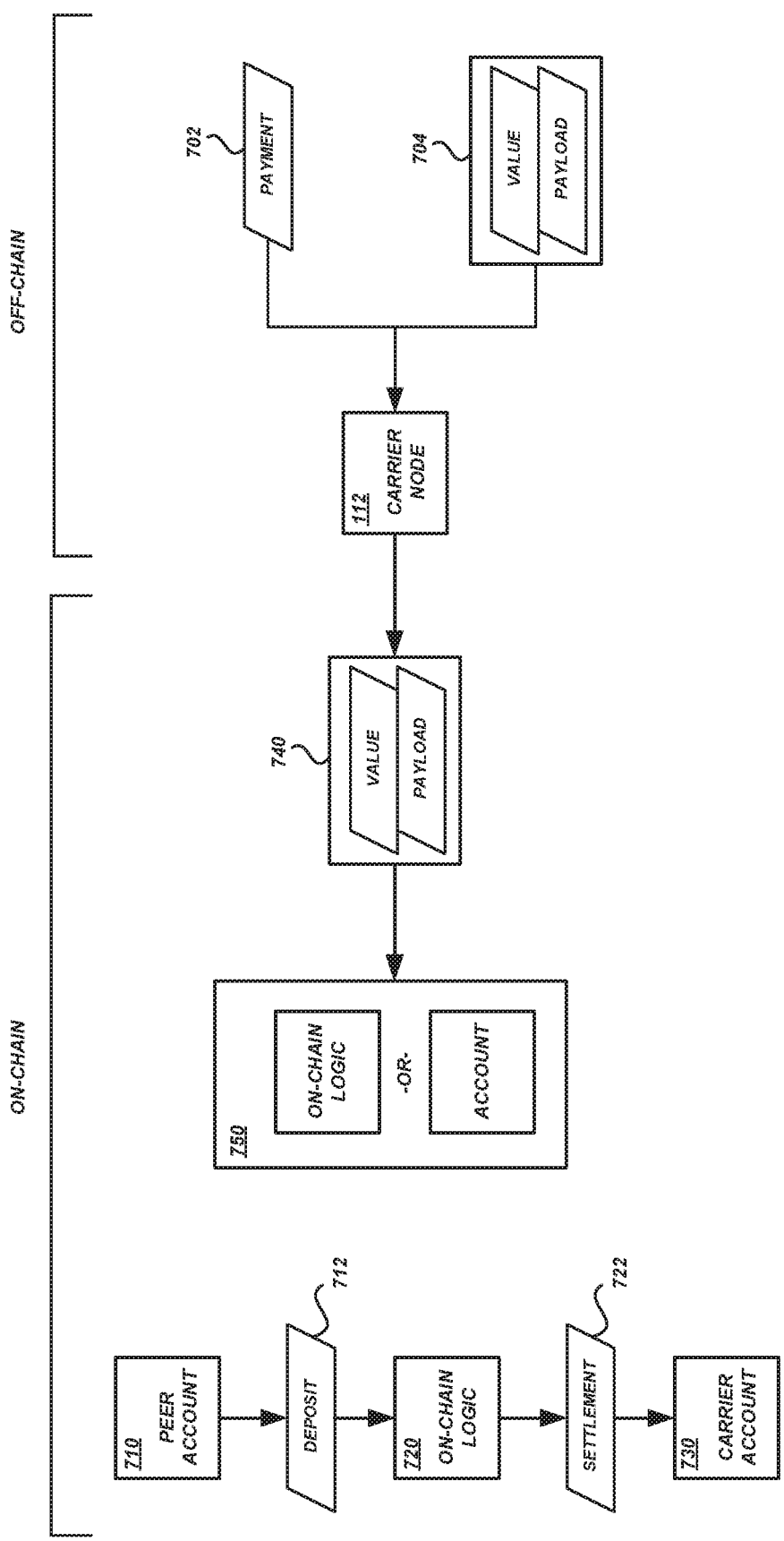
FIG. 7 is a block diagram of various data flows and interactions between a blockchain network and various other systems and networks using a payment channel and a communication from a user device to an entity on the blockchain network according to some embodiments.

FIG. 7 shows example data flows and interactions between a blockchain network 100 and other systems and networks, including a payment channel, during processing of an inbound communication. An entity, such as a company or individual person, may use a user device 130 to interact with the blockchain network 100. The entity may wish to invoke a particular function of the blockchain network, such as the transfer of value from one account to another account upon the occurrence of some condition. The user device 130 may provide a first telephony-based message regarding payment 702 to the carrier system 110. The user device 130 may provide a second telephony-based message 704 to be processed by the carrier system 110 and submitted to a separate on-chain account or on-chain logic.

The carrier node 112 may initiate a payment transaction based on the payment message 702. Illustratively, the payment transaction may result in the transfer of value 712 from the user's account 710 to carrier system on-chain logic 720 as payment for subsequently providing blockchain network access services. In this way, the carrier system 110 allows the user device 130 to subsequently submit messages to the blockchain network 100 through the carrier system 110 without any payment related delays. The carrier system on-chain logic 720 may hold the value for any length of time as advance payment for providing blockchain network access services to the user device 130, and the carrier system on-chain logic 720 may settle the account at any time based on the performance of services. Carrier node 112 may initiate a separate blockchain transaction by providing blockchain transaction data 740 to the blockchain network 100, where it is detected, received, or otherwise obtained by a destination 750, such as on-chain logic or a blockchain account for the target of the message. In addition, once the payment channel has settled, a settlement 722 may be provided to the carrier's on-chain account 730.

Example Processes

Figure 8:
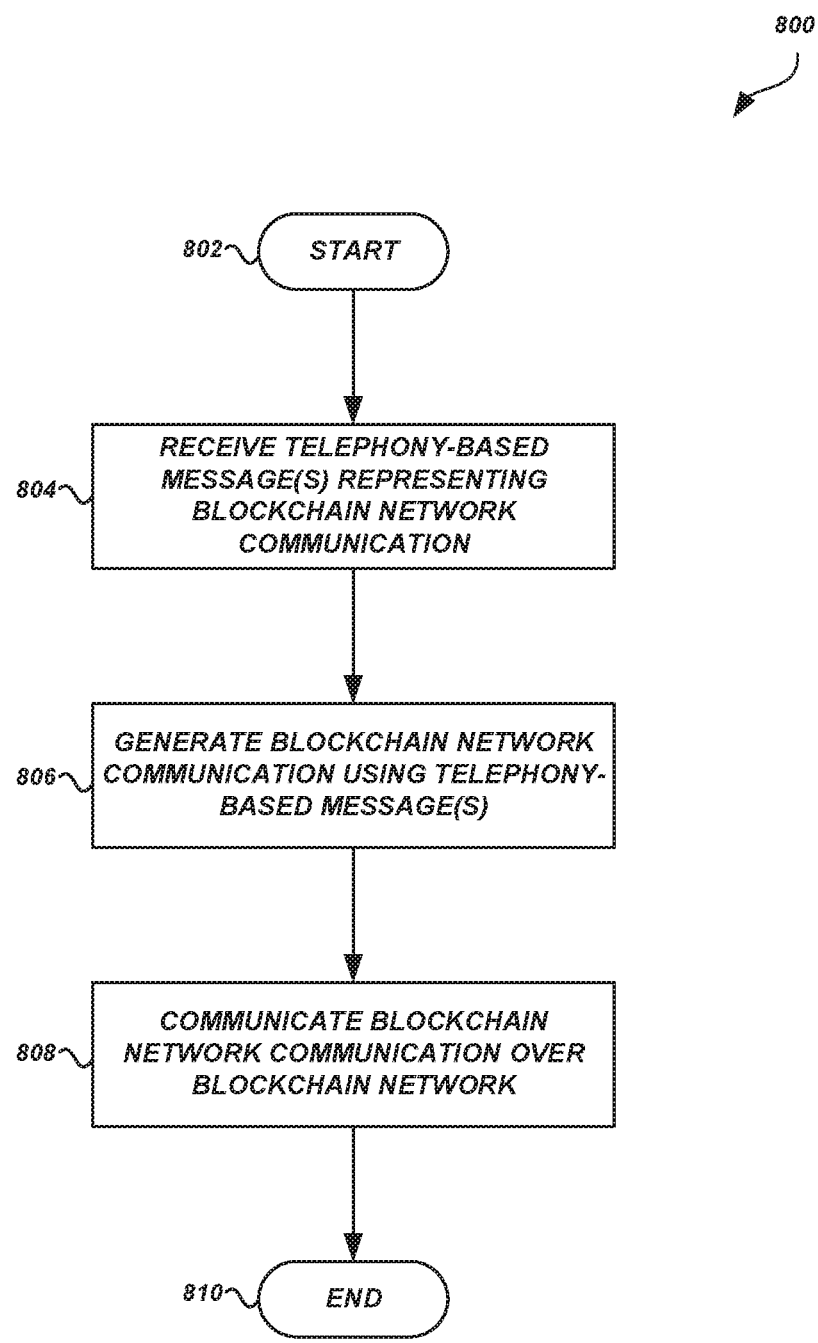
FIG. 8 is a flow diagram of an illustrative process to generate blockchain network communications from telephony-based messages according to some embodiments.

FIG. 8 is a flow diagram of an illustrative process 800 that may be executed by a carrier system 110 to process telephony-based messages and generate blockchain network communications.

The process 800 begins at block 802. When the process 800 is initiated, a set of executable program instructions stored on one or more non-transitory computer-readable media (e.g., hard drive, flash memory, removable media, etc.) may be loaded into memory (e.g., random access memory or "RAM") of a computing device of the carrier system 110, such as the computing device 1000 shown in FIG. 10 and described in greater detail below. The executable instructions may then be executed by a hardware-based computer processor (e.g., a central processing unit or "CPU") of the computing device. In some embodiments, the process 800 or portions thereof may be implemented on multiple processors, serially or in parallel.

At block 804, the carrier system 110 can receive one or more telephony-based messages representing a blockchain network communication, as described in greater detail above. A single telephony-based message may include data representing the blockchain network communication. In some embodiments, telephony-based messages may be limited in the amount or type of data that may be transmitted. For example, SMS messages have a limit of 160 characters, and messages exceeding 160 characters will be segmented into multiple messages such that each individual segmented message of the set of segmented messages is less than or equal to the size limit. In some embodiments, depending on the size of a telephony-based message that a user device 130 is to transmit to the carrier system 110, the user device 130 may generate a compressed version of the message content (e.g., using a lossless compression algorithm). For example, if the user device 130 determines that the size of the message may be compressed to fit within a single SMS message without segmentation, then the user device 130 may generate a compressed version of the message for transmission to the carrier system. Upon receipt of the compressed message, the carrier system 110 may determine that the message has been compressed and may decompress the message before proceeding with processing. In some cases, message segmentation is unavoidable. To handle such cases, the carrier system 110 can support segmentation. For example, the carrier system 110 may detect that a plurality of recently-received telephony-based messages are segments of a single message, or that a received telephony-based message is the first segment of multiple segments and should not be processed separately. Illustratively, the determination may be based on a sequence identifier or other indicator included in the message, on a manifest that is sent with or separately from the segments, etc. Once all segments have been received, the carrier system 110 may splice the segments together to recover the original message and proceed with processing. In some embodiments, a user device 130 may use an alternative telephony-based protocol (e.g., MMS) when sending a message that exceeds the limits of a preferred telephony-based protocol.

At block 806, the carrier system 110 can generate a blockchain network communication using the received telephony-based message(s) as described in greater detail above.

At block 808, the carrier system 110 can communicate the blockchain network communication over the blockchain network as described in greater detail above. The process 800 may then terminate at block 810.

Figure 9:
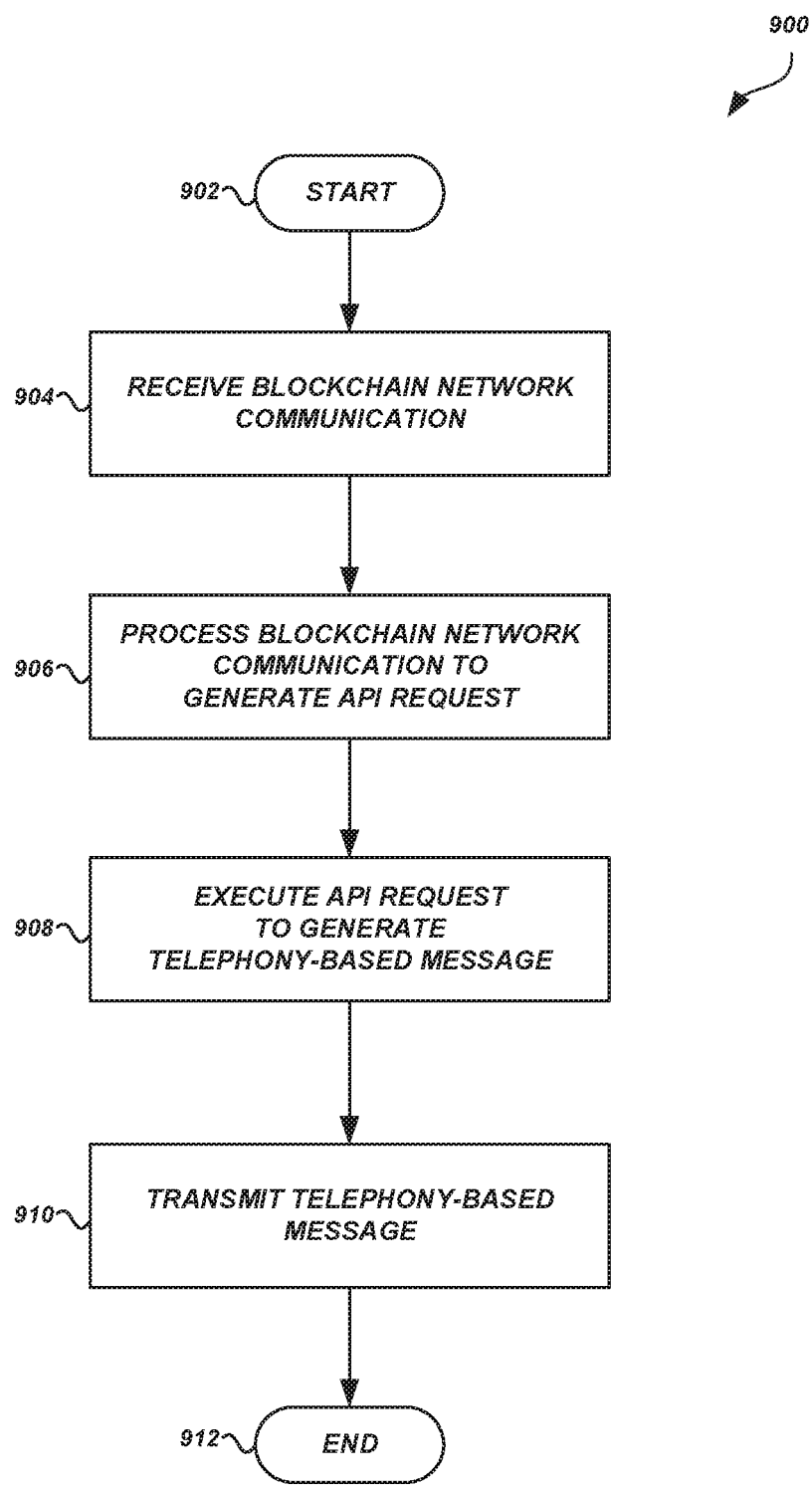
FIG. 9 is a flow diagram of an illustrative process to generate telephony-based messages from blockchain network communications according to some embodiments.

FIG. 9 is a flow diagram of an illustrative process 900 that may be executed by a carrier system 110 to process a blockchain network communication and generate a telephony-based message.

The process 900 begins at block 902. When the process 900 is initiated, a set of executable program instructions stored on one or more non-transitory computer-readable media (e.g., hard drive, flash memory, removable media, etc.) may be loaded into memory (e.g., random access memory or "RAM") of a computing device of the carrier system 110, such as the computing device 1000 shown in FIG. 10 and described in greater detail below. The executable instructions may then be executed by a hardware-based computer processor (e.g., a central processing unit or "CPU") of the computing device. In some embodiments, the process 900 or portions thereof may be implemented on multiple processors, serially or in parallel.

At block 904, the carrier system 110 can receive a blockchain network communication over a blockchain network as described in greater detail above.

At block 906, the carrier system 110 can process the blockchain network communication to generate an API request, for a function provided by the carrier system API, as described in greater detail above. In some embodiments, templates for telephony-based messages may be used to cut down on the amount of data handled by the blockchain network 100. For example, the carrier system 110 may provide a selection of message templates for use by entities that send messages via the carrier system 110, or entities may provide their own templates to the carrier system 110. The templates may be associated with unique identifiers. An entity may submit an API request to the carrier system 110 via the blockchain network to send a message to an end user device 130. Rather than including the entire contents of the message in the API request that is communicated via the blockchain network 100, the entity may reference a template identifier in the API request. The carrier system 110 can access the previously-stored template information for the identifier and process the API request accordingly.

In some embodiments, a template may include one or more dynamic portions that are customizable from message-to-message. An entity may include the dynamic portions in the API request, along with the template identifier. The carrier system 110 can use the provided dynamic portions along with the corresponding template when fulfilling the API request. For example, an entity may generate (or cause generation of) blockchain message data that includes one or more template identifiers, contact information or identifiers for one or more recipients, and dynamic portions to be included in the template. The carrier system 110 can load the identified template(s), add the dynamic portion(s) to the template(s), and send a telephony-based message to one or more recipients.

In some cases, it is not viable to store contact lists and other sensitive information on the blockchain network 100, as this storage can be costly and a security risk. The carrier system 110 can store such data off-chain and along with identifiers to be included in API requests instead. For example, an entity may provide a list of contact information (e.g., phone numbers) and corresponding identifiers to the carrier system 110 in an off-chain communication. Then, when submitting an API request to send a telephony-based message to a particular end user, the entity may include the identifier of the entity in the API request rather than the actual contact information for the end user. The carrier system 110 can access the previously-stored contact information for the identifier and process the API request accordingly. In the case that a particular application requires sensitive data to be present on the blockchain network 100, the carrier system 110 can provide public keys for encryption prior to submission on-chain. For example, entities can encrypt a message payload prior to submission to the blockchain network 100, and the carrier node 112 or other carrier infrastructure can decrypt the payload when fulfilling an API request.

At block 910, the carrier system 110 can transmit the telephony-based message over the telephony as described in greater detail above. The process 800 may then terminate at block 912.

Example Computing Device

Figure 10:
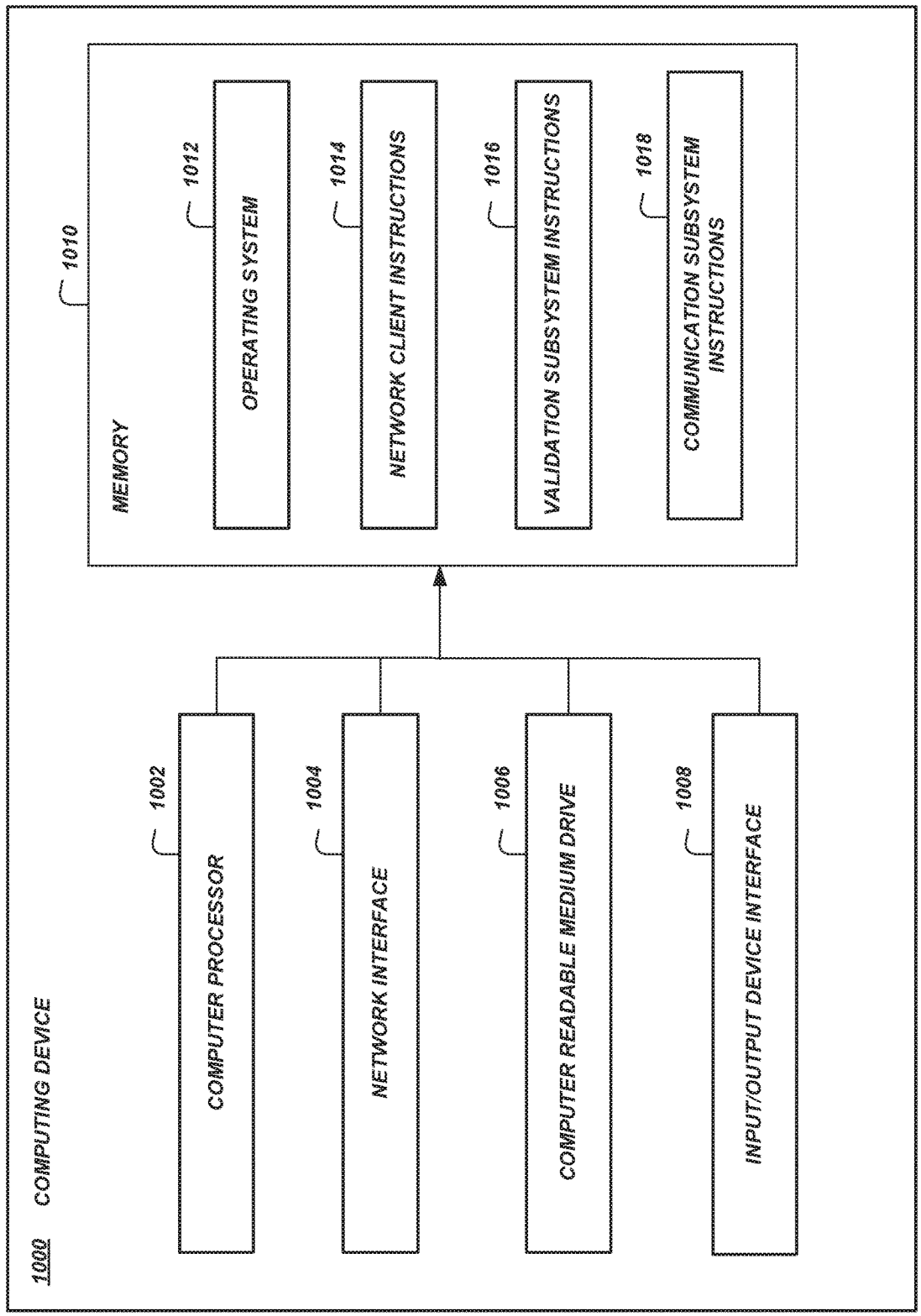
FIG. 10 is a block diagram illustrating components of a computing device configured to execute processes for blockchain network and telephony network communication according to some embodiments

FIG. 10 illustrates the various components of an example computing device 1000 configured to implement some or all of the functionality of a carrier system 110. In some embodiments, as shown, the computing device 1000 may include: one or more computer processors 1002, such as physical central processing units ("CPUs"); one or more network interfaces 1004, such as a network interface cards ("NICs"); one or more computer readable medium drives 1006, such as a high density disks ("HDDs"), solid state drives ("SDDs"), flash drives, and/or other persistent non-transitory computer-readable media; an input/output device interface 1008, such as an IO interface in communication with one or more microphones; and one or more computer readable memories 1010, such as random access memory ("RAM") and/or other volatile non-transitory computer-readable media.

The computer readable memory 1010 may include computer program instructions that one or more computer processors 1002 execute in order to implement one or more embodiments. The computer readable memory 1010 can store an operating system 1012 that provides computer program instructions for use by the computer processor(s) 1002 in the general administration and operation of the computing device 1000. In some embodiments, the computer readable memory 1010 can further include computer program instructions and other information for implementing aspects of the present disclosure. For example, in one embodiment, the computer-readable memory 1010 may include network client instructions 1014 for implementing features of the network client 150, validation subsystem instructions 1016 for implementing features of the validation subsystem 152, communication subsystem instructions 1018 for implementing features of the communication subsystem 154, instructions for implementing other features, or some combination thereof.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
computer-readable memory storing executable instructions; and
one or more processors in communication with the computer-readable memory and configured by the executable instructions to at least:
receive a first short message service ("SMS") message from a first computing device over a telephony network, wherein the first SMS message is addressed to a first phone number associated with the system, wherein the first SMS message includes a first data payload comprising a first signed blockchain network transaction data structure to be communicated over a blockchain network, and wherein the first signed blockchain network transaction data structure comprises a source blockchain network address, a destination blockchain network address associated with a smart contract of the blockchain network, and a blockchain network transaction value;
extract the first signed blockchain network transaction data structure from the first data payload of the first SMS message;
communicate the first signed blockchain network transaction data structure over the blockchain network to the smart contract using the destination blockchain network address;
receive a second signed blockchain network transaction data structure over the blockchain network, wherein the second signed blockchain network transaction data structure comprises a second data payload representing an application programming interface ("API") request associated with an API of the system;
process the second signed blockchain network transaction data structure to generate the API request, wherein the API request comprises a request to send a second SMS message addressed to a second phone number;
execute the API request to generate the second SMS message, wherein the second SMS message comprises content based at least in part on the second data payload of the second signed blockchain network transaction data structure; and
transmit the second SMS message over the telephony network to a second computing device associated with the second phone number.

2. The system of claim 1, wherein the one or more processors are further configured by the executable instructions to at least:
generate a third blockchain network transaction data structure using the first signed blockchain network transaction data structure; and
generate a signed version of the third blockchain network transaction data structure using a key associated with a source of the first SMS message.

3. A computer-implemented method comprising:
as implemented by a computing system comprising one or more computer processors configured to execute specific instructions,
receiving a telephony-based message from a computing device over a telephony network,
wherein the telephony-based message is addressed to a first phone number and comprises one of a short message service ("SMS") message or a multimedia messaging service ("MMS") message,
wherein the telephony-based message comprises a first data payload comprising a signed blockchain network communication data structure, and
wherein the signed blockchain network communication data structure comprises a source blockchain network address, a destination blockchain network address associated with a smart contract of a blockchain network, and a second data payload;

extracting the signed blockchain network communication data structure from the telephony-based message; and communicating the signed blockchain network communication data structure over the blockchain network to the smart contract using the destination blockchain network address, wherein the smart contract obtains the signed blockchain network communication data structure over the blockchain network.

4. The computer-implemented method of claim 3, further comprising:

generating a second blockchain network communication data structure using the second data payload; and generating a signed version of the second blockchain network communication data structure.

5. The computer-implemented method of claim 3, further comprising determining a source blockchain account to be used as a source of the signed blockchain network communication data structure.

6. The computer-implemented method of claim 3, further comprising receiving a second telephony-based message from the computing device over the telephony network, wherein the telephony-based message comprises a first segment of the signed blockchain network communication data structure, and wherein the second telephony-based message comprises a second segment of the signed blockchain network communication data structure.

7. The computer-implemented method of claim 3, wherein communicating the signed blockchain network communication data structure comprises causing invocation of the smart contract to process the signed blockchain network communication data structure on the blockchain network.

8. The computer-implemented method of claim 3, wherein extracting the signed blockchain network communication data structure from the telephony-based message comprises deserializing a serialized version of the signed blockchain network communication data structure.

9. The computer-implemented method of claim 3, further comprising:

receiving a second signed blockchain network communication data structure over the blockchain network, wherein the second signed blockchain network communication data structure comprises a second destination blockchain network address and a third data payload, wherein the third data payload comprises a serialized version of an application programming interface ("API") request associated with an API of the computing system;

deserializing the serialized version of the API request, wherein the API request comprises a request to send a second telephony-based message addressed to a second phone number;

executing the API request to generate the second telephony-based message, wherein content of the second telephony-based message is based at least in part on the third data payload; and transmitting the second telephony-based message to a second computing device associated with the second phone number.

10. The computer-implemented method of claim 9, further comprising:

determining a message template based at least partly on a template identifier in the third data payload; and obtaining the message template.

11. The computer-implemented method of claim 10, further comprising determining content of a dynamic message portion based at least partly on the third data payload, wherein the second telephony-based message is based at least partly on the message template and the dynamic message portion.

12. A system comprising:

computer-readable memory storing executable instructions; and one or more processors in communication with the computer-readable memory and configured by the executable instructions to at least:

receive a telephony-based message from a computing device over a telephony network,
wherein the telephony-based message is addressed to a first phone number and comprises one of a short message service ("SMS") message or a multimedia messaging service ("MMS") message,
wherein the telephony-based message comprises a first data payload comprising a signed blockchain network communication data structure, and
wherein the signed blockchain network communication data structure comprises a source blockchain network address, a destination blockchain network address associated with a smart contract of a blockchain network, and a second data payload;

extract the signed blockchain network communication data structure from the telephony-based message; and communicate the signed blockchain network communication data structure over the blockchain network to the smart contract using the destination blockchain network address, wherein the smart contract obtains the signed blockchain network communication data structure over the blockchain network.

13. The system of claim 12, wherein the one or more processors are further configured by the executable instructions to:

generate a second blockchain network communication data structure using the second data payload; and generate a signed version of the second blockchain network communication data structure.

14. The system of claim 12, wherein the one or more processors are further configured by the executable instructions to determine a source blockchain account to be used as the source of the signed blockchain network communication data structure.

15. The system of claim 12, wherein the one or more processors are further configured by the executable instructions to receive a second telephony-based message from the computing device over the telephony network, wherein the telephony-based message comprises a first segment of the signed blockchain network communication data structure, wherein the second telephony-based message comprises a second segment of the signed blockchain network communication data structure.

16. The system of claim 12, wherein to communicate the signed blockchain network communication data structure, the one or more processors are further configured to cause invocation of the smart contract to process the signed blockchain network communication data structure on the blockchain network.

17. The system of claim 12, wherein to extract the signed blockchain network communication data structure from the telephony-based message, the one or more processors are further configured to deserialize a serialized version of the signed blockchain network communication data structure.

18. The system of claim 12, wherein the one or more processors are further configured by the executable instructions to:
- receive a second signed blockchain network communication data structure over the blockchain network, wherein the second signed blockchain network communication data structure comprises a second destination blockchain network address and a third data payload, wherein the third data payload comprises a serialized version of an application programming interface ("API") request associated with an API of the computing system;
- deserialize the serialized version of the API request, wherein the API request comprises a request to send a second telephony-based message addressed to a second phone number;
- execute the API request to generate the second telephony-based message, wherein content of the second telephony-based message is based at least in part on the third data payload; and
- transmit the second telephony-based message to a second computing device associated with the second phone number.

* * * * *